Patented June 11, 1929.

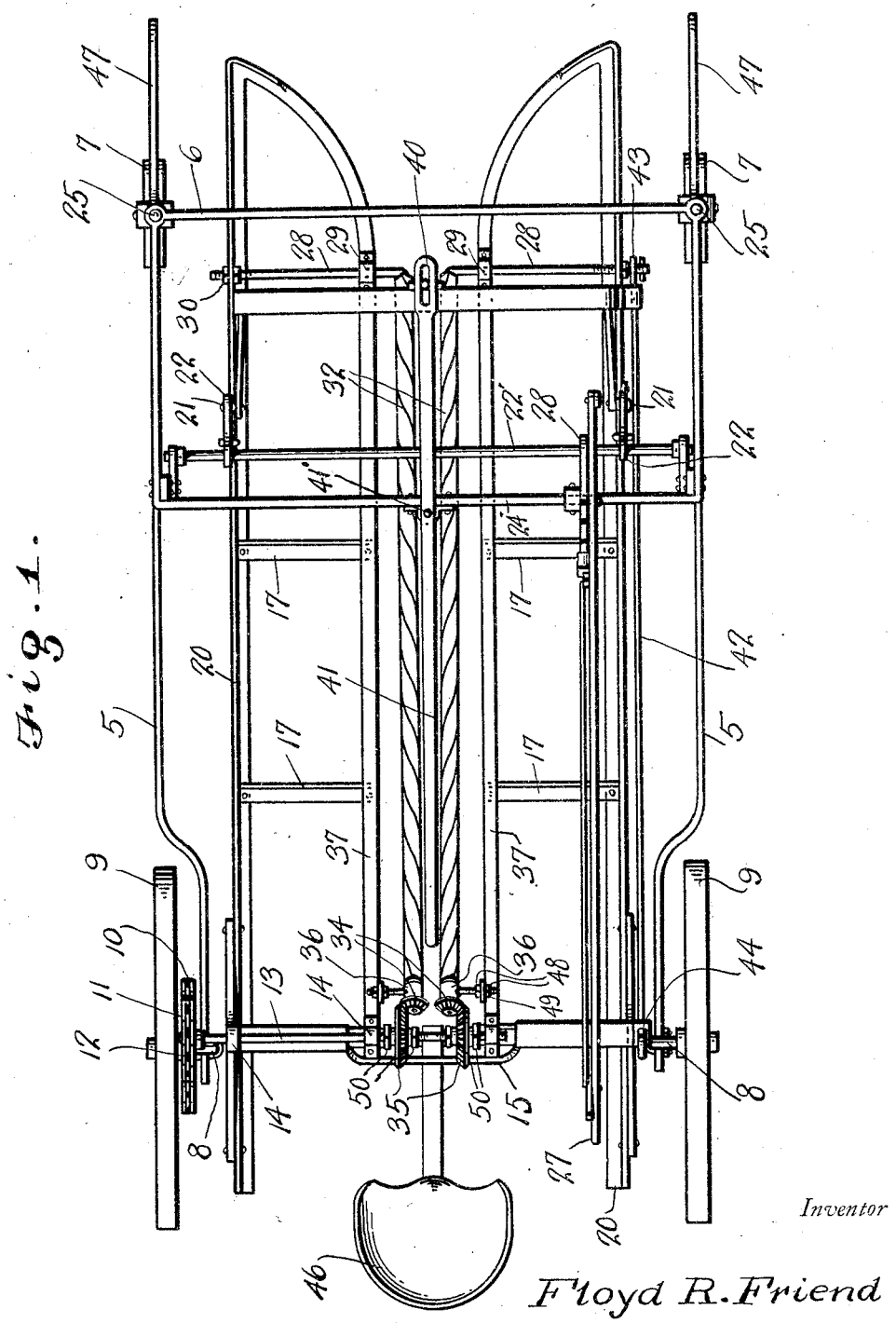

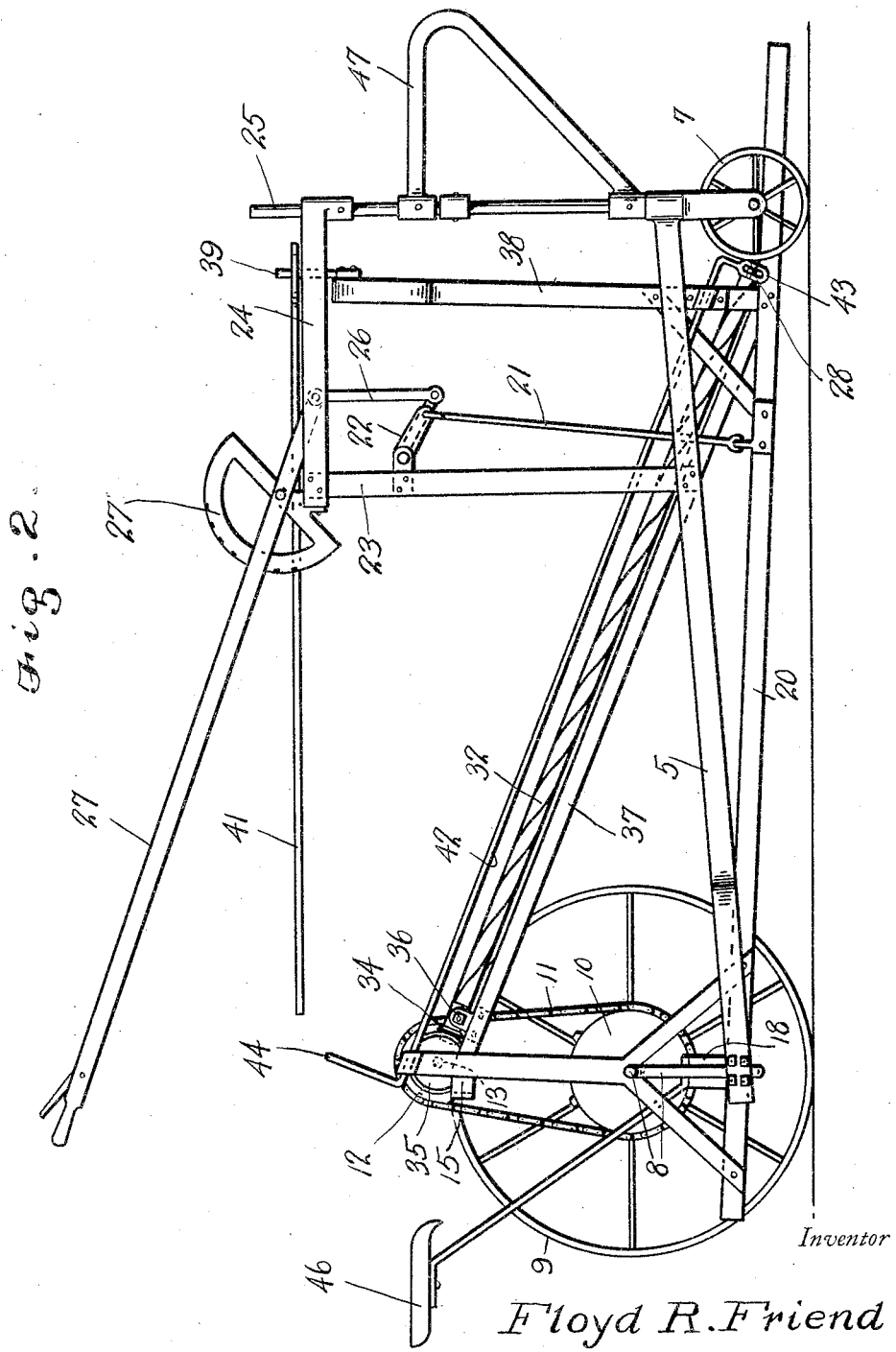

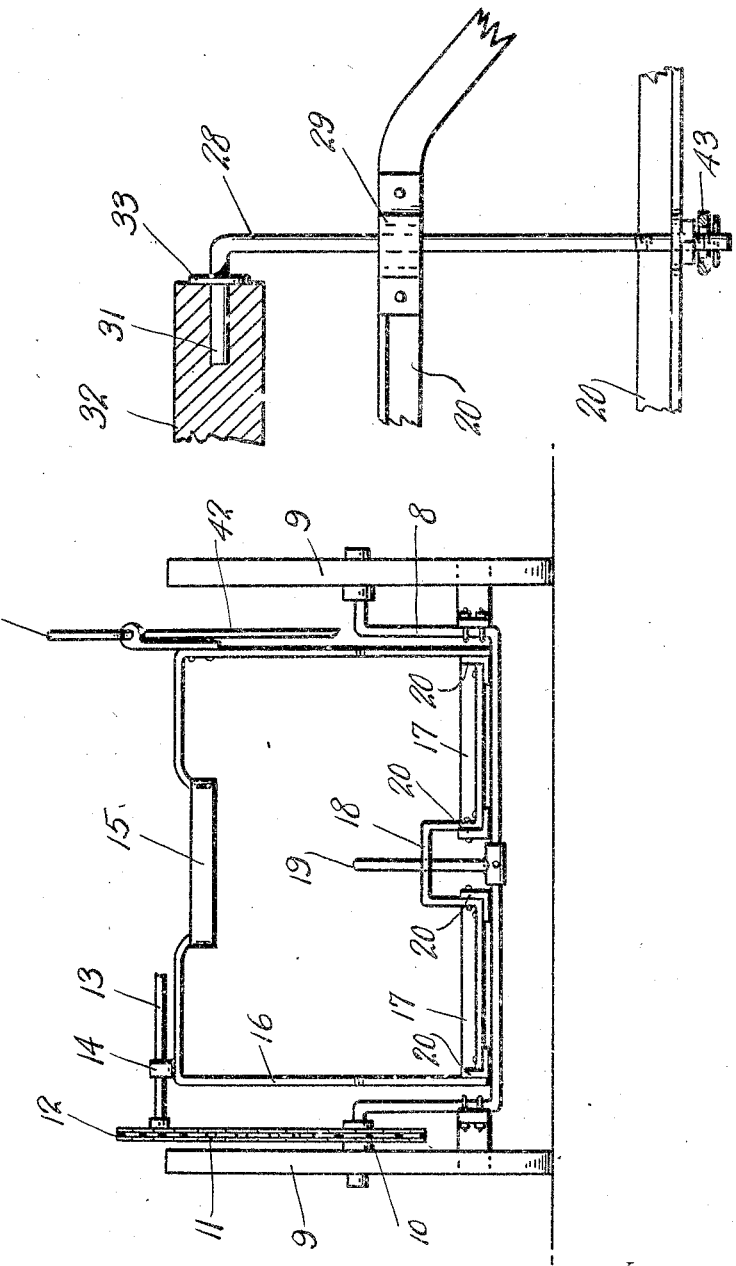

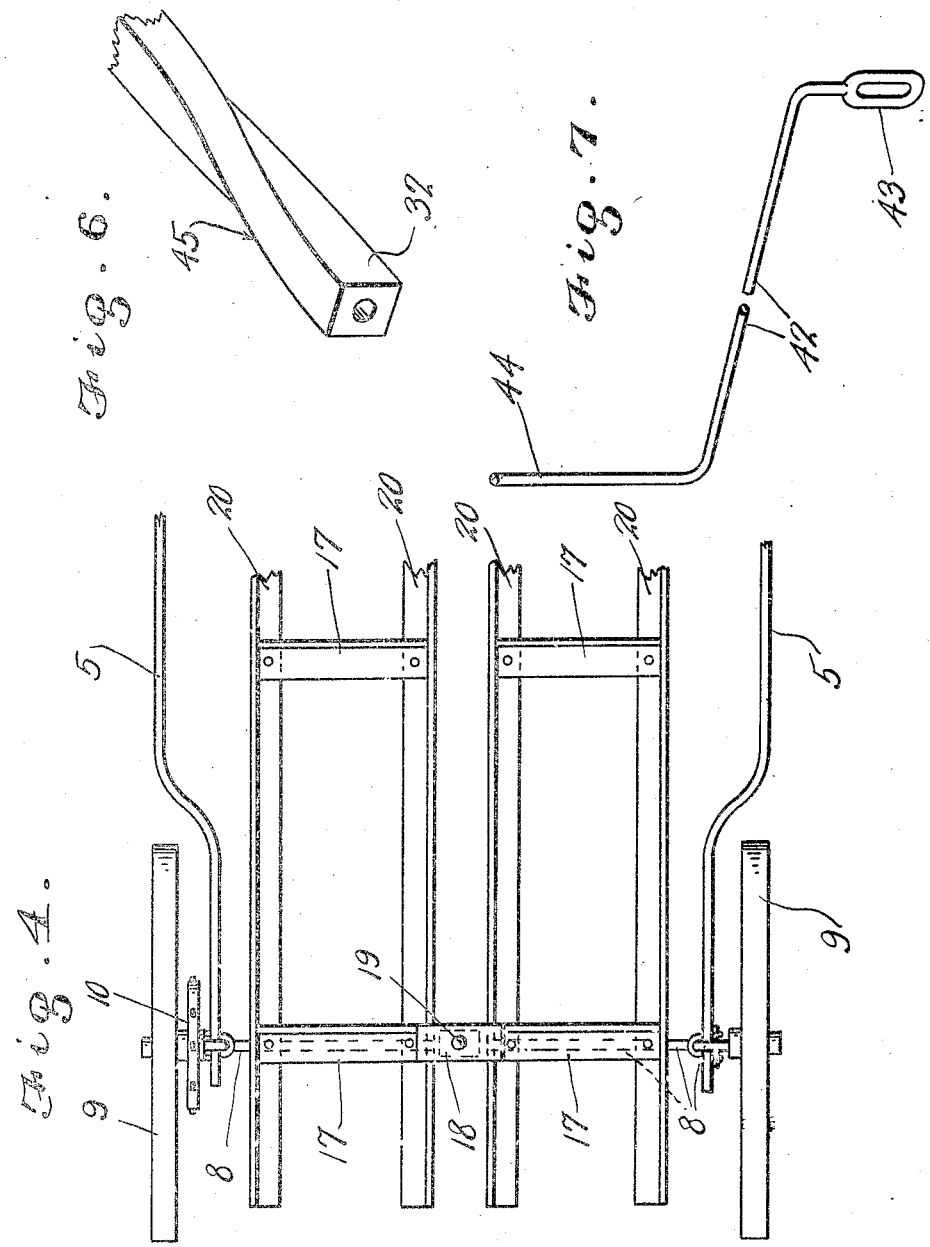

1,716,769

UNITED STATES PATENT OFFICE.

FLOYD R. FRIEND, OF LUBBOCK, TEXAS.

COTTON STRIPPER.

Application filed July 6, 1927. Serial No. 203,809.

This invention relates to machines adapted to be drawn over a field of growing cotton and provided with means for engaging the cotton stalks whereby to strip the cotton bolls therefrom.

The invention has for an important object to provide a pair of rotatably mounted cotton strippers arranged in spaced parallel relation and having spirally arranged stripping edges formed thereon and means for controlling the forward edge of the strippers for the purpose of guiding the cotton stalks between the same.

Separate means are also provided for raising or lowering these forward ends of the strippers whereby to vertically raise or lower the same in order to strip the cotton from either high or low stalks.

A still further object is to provide means for adjusting the position of the strippers with respect to each other.

Another object is to provide an apparatus of this character of a simple and practical construction, strong and durable, efficient and reliable in performance, relatively inexpensive to manufacture, and otherwise well adapted for the purposes for which the same is intended.

Other objects and advantages reside in the special construction, combination and arrangement of the various elements forming the invention as more clearly hereinafter described and claimed, reference being had to the accompanying drawings forming part hereof, wherein:

Figure 1 is a top plan view.

Figure 2 is a side elevational view.

Figure 3 is a rear end view with the stripper removed and showing the manner of mounting the rear of the frame.

Figure 4 is a top plan view of the rear end of the machine with the stripping apparatus removed.

Figure 5 is a detail showing the adjustable mounting for the front ends of the stripper rod.

Figure 6 is a fragmentary perspective view of one end of the stripper rods, and, Figure 7 is a perspective view of the adjusting lever for spacing the front ends of the strippers.

Referring now to the drawing wherein for the purpose of illustration I have disclosed a preferred embodiment of my invention, I provide a cotton stripping apparatus comprising a stationary frame formed of a pair of longitudinally extending side members 5 having their front ends connected by a transverse member 6 and upon which is mounted a pair of front ground engaging wheels 7, the rear ends of the side members 5 being clamped at opposite sides to a substantially U-shaped rear axle 8 as shown in Figure 3 of the drawing. The rear axle 8 provides supporting means for rear wheels 9, one of which is provided at its hub with a sprocket wheel 10 carrying a chain 11 operatively connected with an upper sprocket wheel 12 mounted on the end of a transversely extending shaft 13. The shaft 13 is journaled in bearing brackets 14 arranged on the upper end of a rear stripping frame support 15, said rear stripping frame support comprising a pair of vertically arranged side members 16 connected at their lower ends with the longitudinally extending member 20 of a pair of horizontally disposed receptacle supporting frames. The members 20 are connected at spaced intervals with transverse member 17, the rear end of the members 20 having an inverted U-shaped bracket 18 connecting the same in spaced parallel relation with an opening formed therein adapted to receive a vertically extending rod 19 mounted on the rear axle 8. The rear ends of the frame 20 rest upon and are supported by the rear axle 8 so as to permit free horizontal swinging movement thereof.

The frames 20 are movable both vertically and horizontally in a transverse direction and are supported near their front ends by upwardly extending rods 21 having their upper ends pivotally connected with pivotally mounted arms 22 carried on a transverse bar 22' secured by uprights 23 supporting a stationary upper frame 24, which frame has its forward end supported by posts 25 extending upwardly from the mounting for the forward wheels 7. To the arms 22 is connected a link 26, having its upper end pivotally connected with a lever 27 extending rearwardly of the machine and arranged to be secured in adjusted position by a quadrant 27', supported on a transverse frame member 24', said lever thereby providing means for vertically adjusting the frames 20.

The adjacent sides of the frames 20 are arranged in spaced parallel relation as shown in Figure 1 of the drawing, the forward ends of each of said frames being curved inwardly so as to act as a guide and direct the cotton stalks between the frames as the machine travels forwardly. Each of the frames 20 carry transversely arranged rods 28 near their forward ends suitably supported in brackets 29, with the outer ends of each thereof fixedly secured to the outer edge of the frame by bolts and nuts 30 and having their opposite ends bent at right angles in a rearward direction as shown at 31 and constituting a bearing for the forward end of a stripper 32, said stripper being rotatably mounted on the end of the rod 31 and secured against forward movement with respect to the rod 28 by means of a collar 33. The strippers 32 carried on the inner end of each of the rods 28 are arranged in spaced parallel relation and extend longitudinally between the inner edges of the frame 20 and provided with bevelled gears 34 at the rear ends thereof, said gears being engaged by similar gears 35 mounted on the shaft 13. The rear ends of these strippers may be supported in bearing brackets 36 carried on inclined frame members 37 extending longitudinally of the machine in parallel relation with the strippers.

Near the forward ends of the frames 20 is arranged an arch-shaped member 38 having its upper edge provided with a vertically extending pin 39 adapted to be received in the slotted end 40 of a horizontally shifting lever 41, said lever being pivotally mounted at 41' intermediate its end to the transverse member 24'. This lever 41 permits the forward ends of the frames 20 and the strippers 32 to be moved horizontally in a side to side direction whereby to guide the cotton stalks between the same.

I also provide means for adjusting the space between the forward ends of the strippers 32 by means of an angular lever 42 having a slotted end 43 arranged forwardly thereof and arranged to receive the outer end of the rod 28 on which the forward end of one of the strippers is mounted, said lever 42 extending rearwardly with an operating handle 44 arranged on the rear end adapted to slide the rod 28 transversely whereby to move the forward end of the stripper carried thereon toward or away from the opposite stripper.

As shown in Figure 6 of the drawing the strippers are constructed of twisted bars, which may be either square-shaped in cross-section or hexagonally or otherwise shaped to form flattened sides thereon. By twisting the bars the edges 45 thereof are thus spirally arranged and provide relatively sharpened stripping edges. As shown in Figure 1 of the drawing the strippers 32 are arranged to rotate in opposite directions and outwardly with respect to each other so that the cotton bolls when stripped from the cotton stalks are discharged at opposite sides of the stripper and into suitable receptacles which may be carried by the frames 20. As will be noted from an inspection of Figure 2 of the drawing the strippers are arranged at an inclined angle, extending upwardly toward the rear of the machine thereby adapting the same for use with respect to plants of varying heights. In addition, the forward end of the strippers may be adjusted vertically by the lever 27 so as to elevate the frames 20 sufficiently above the ground to avoid contact with obstacles as well as to strip the bolls from either high or low plants.

The lever for vertically adjusting the frame as well as the lever for guiding the frames transversely and for adjusting the forward end of one of the strippers are arranged for operation within easy reach of the driver's seat 46 so that the same may be manipulated without the necessity of the driver leaving his seat.

The bearing brackets 36 include means for adjusting the rear ends of the strippers 32 in spaced relation comprising a threaded bolt 48 securing the bracket to the frame member 37 and having adjusting nuts 49 adapted to move the bracket transversely thus permitting the strippers to be moved toward or away from each other. The gears 35 are likewise adjustable transversely to compensate for the movement of the gears carried on the strippers, said gears being threadedly carried on the shaft 13 and having adjusting nuts 50 for securing the gears in transversely adjusted position.

A pair of vehicle attaching brackets 47 are carried by the front vertical frame member 25 whereby to attach a suitable draft appliance for drawing the machine over the field.

It is obvious that the invention is susceptible to various changes and modifications without departing from the spirit or scope of the appended claims and I accordingly claim all such forms of the device to which I am entitled.

I claim:—

1. In an apparatus of the class described, a vehicle having a stationary frame mounted thereon, a movable frame supported at its rear end upon said stationary frame, said movable frame including a pair of horizontally disposed frame members arranged in spaced parallel relation at opposite sides of the vehicle and having guides formed at their forward ends, said movable frame having its forward end mounted for vertical and transverse adjustment with respect to said stationary frame, a pair of stripper rods arranged in spaced parallel relation between said movable frame members and rotatably supported thereon, and having operating gears arranged at the rear ends of said strippers, and transverse adjusting means for each end of said stripper rod independent from said frame member adjustment.

2. In an apparatus of the class described, a vehicle having a stationary frame mounted thereon, a movable frame including a pair of horizontally disposed frame members arranged longitudinally in spaced parallel relation at opposite sides of the vehicle and having their rear ends supported by said stationary frame for free horizontal swinging movement and having guides formed at the front ends thereof, means for suspending the forward ends of said movable members from said stationary frame, permitting vertical adjustment of said members, an arch-shaped connecting member at the forward ends of said frame members, a pin extending upwardly therefrom, a pivotally mounted lever engaging said pin whereby to shift said members transversely of the vehicle, a transversely arranged rod freely mounted at the forward end of each of said members, a pair of longitudinally extending spaced parallel stripper bars rotatably mounted at their forward ends on said rod and operatively connected at their rear ends with the wheels of the vehicle and a lever controlled from the rear of said bars and connected with one of said transverse rods adapted to adjust the forward ends of the strippers with respect to each other.

In testimony whereof I affix my signature.

FLOYD R. FRIEND.